(12) United States Patent
Solignac (10) Patent No.: US 8,256,950 B2
(45) Date of Patent: Sep. 4, 2012

(54) MACHINE FOR THE AUTOMATED PRODUCTION OF COMPOSITIONS OF RAW MATERIALS SUCH AS LIQUIDS, POWDERS OR PASTES IN A MOBILE TANK

(76) Inventor: Jean-Pierre Solignac, Saint Mathieu de Treviers (FR)

( * ) Notice: Subject to any disclaimer, the term of this patent is extended or adjusted under 35 U.S.C. 154(b) by 629 days.

(21) Appl. No.: 12/520,550

(22) PCT Filed: Dec. 21, 2007

(86) PCT No.: PCT/EP2007/064503
§ 371 (c)(1), (2), (4) Date: Jun. 22, 2009

(87) PCT Pub. No.: WO2008/077960
PCT Pub. Date: Jul. 3, 2008

(65) Prior Publication Data
US 2010/0043919 A1   Feb. 25, 2010

(30) Foreign Application Priority Data
Dec. 22, 2006   (FR) .................................... 06 11236

(51) Int. Cl.
*B01F 15/02* (2006.01)
(52) U.S. Cl. ............... 366/138; 366/141; 141/103
(58) Field of Classification Search .............. 366/110, 366/111, 114, 208–217, 219, 605, 141, 136, 366/137, 138, 160.1, 162.1, 173.1, 173.2, 366/181.6; 53/50; 141/103, 329
See application file for complete search history.

(56) References Cited

U.S. PATENT DOCUMENTS

| | | | | |
|---|---|---|---|---|
| 5,083,591 A * | 1/1992 | Edwards et al. | .................. | 141/9 |
| 5,116,134 A * | 5/1992 | Edwards et al. | .............. | 366/208 |
| 5,163,484 A * | 11/1992 | Howlett et al. | .................... | 141/9 |
| 5,203,387 A * | 4/1993 | Howlett et al. | ............... | 141/103 |
| 5,268,849 A * | 12/1993 | Howlett et al. | ............... | 700/226 |
| 5,365,722 A * | 11/1994 | Edwards et al. | ................. | 53/502 |
| 5,493,840 A * | 2/1996 | Cane | ................................. | 53/50 |
| 5,584,326 A * | 12/1996 | Galli | ............................... | 141/83 |
| 6,969,190 B1 * | 11/2005 | McClain et al. | .............. | 366/141 |
| 7,065,429 B1 * | 6/2006 | McClain et al. | .............. | 700/239 |
| 7,571,122 B2 * | 8/2009 | Howes | .......................... | 705/26.1 |
| 7,654,727 B2 * | 2/2010 | McClain et al. | .............. | 366/141 |

(Continued)

FOREIGN PATENT DOCUMENTS
EP   0 099 252   1/1984
(Continued)

*Primary Examiner* — Charles E Cooley
(74) *Attorney, Agent, or Firm* — Oblon, Spivak, McClelland, Maier & Neustadt, L.L.P.

(57) ABSTRACT

A machine for the automated production of raw-materials compositions in at least one vat. The machine includes a guiding assembly provided above the ground. A bearing frame capable of displacement on the guiding frame is disposed along a first horizontal longitudinal axis. A transport carriage capable of displacement on the bearing frame is disposed along a second horizontal axis perpendicular to the first horizontal axis. A lifting portion, that is supported by the carriage, includes a raising support member capable of displacement along a vertical axis. A weighing portion is supported by the raising support member. The weighing portion includes a platform on which to weigh the load. A gripping portion for gripping vats one by one is mechanically connected to the platform. At least one device for sampling and distributing the raw material, in front of which, the transported vat is to be positioned.

22 Claims, 5 Drawing Sheets

U.S. PATENT DOCUMENTS

| | | |
|---|---|---|
| 7,815,361 B2 * | 10/2010 | Lindblom ............... 366/136 |
| 7,942,569 B2 * | 5/2011 | Orben et al. ............ 366/141 |
| 2006/0124196 A1 | 6/2006 | Bartholomew et al. |
| 2007/0091717 A1 | 4/2007 | Steinwald |
| 2010/0043919 A1 * | 2/2010 | Solignac ............... 141/103 |

FOREIGN PATENT DOCUMENTS

| | | |
|---|---|---|
| EP | 0 654 298 | 5/1995 |
| EP | 1 570 730 | 9/2005 |
| ES | 2 169 957 | 7/2002 |
| WO | 2004 098763 | 11/2004 |
| WO | 2006/008590 A1 * | 1/2006 |

* cited by examiner

MACHINE FOR THE AUTOMATED PRODUCTION OF COMPOSITIONS OF RAW MATERIALS SUCH AS LIQUIDS, POWDERS OR PASTES IN A MOBILE TANK

TECHNICAL BACKGROUND

The present invention relates to a machine for production of compositions from measured amounts of raw materials, such as liquids, powders or pastes disposed in appropriate receptacles. More specifically, the present invention relates to a machine capable of manipulating relatively large-capacity tanks weighing several tens of kilograms and of making compositions weighing several kilograms in these tanks with a high degree of precision.

PRIOR ART

At present, the production of this type of composition is performed manually or semi-automatically. Thus the persons assigned to this task are required to manipulate relatively heavy receptacles by hand or to use transporters of the transpallet type if these receptacles cannot be displaced by hand.

In order to make the composition, the raw materials are withdrawn from corresponding receptacles and introduced in measured amounts into a tank placed on scales embedded in the floor. To introduce the raw materials into the mixing tank, valves are actuated manually.

Such an operating procedure suffers from several disadvantages, including:
- the laborious and unsafe nature of manual or transpallet transportation of receptacles containing the diverse raw materials, as well as of the execution of long and repetitive tasks
- the difficulty of assuring repetitive measurement of components and traceability of the amounts withdrawn,
- the difficulty of assuring a high degree of precision in the measurement of components.

Attempts have been made in the past to overcome the aforesaid problems by employing composition-producing machines comprising endless conveyor belts or equivalent, by means of which the tanks that are to receive raw materials are moved under the devices for withdrawing and delivering these materials and are weighed in the course of delivery.

The main disadvantage of such a solution is that the floor is permanently occupied by the conveyor, thus making it impossible or very difficult to clean the floor completely as required by the sanitary standards in force for certain industries, such as the agro-food industries. It is appropriate to note that this conveyor must also be cleaned, making this task particularly long and tedious. Furthermore, the parts of the conveyor intended to be in contact with cleaning products must be made of material having resistance to the corrosive nature of such products, thus raising the price of these conveyors. It is also appropriate to emphasize that the cleaning of conveyor zones located under the raw-material withdrawing systems is made difficult by the very nature of these materials.

An additional problem in the case of transportation of heavy loads by means of a conveyor of the aforesaid type is that of safety, because of the relative unstable equilibrium of these loads on the conveyor. This problem is further accentuated by the fact that the conveyor rollers cause permanent deformations and therefore loss of flatness of the bottom wall of the tank.

Finally, the conveyors necessitate regular maintenance and very precise adjustment, making them tools that do not operate very reliably.

In certain known installations, the transportation of each tank between the zone in which it is stored and the zone in which raw materials are delivered and vice versa is effected by means of a fork-lift truck. The use of such a transportation means poses problems of safety and personnel training.

DESCRIPTION OF THE INVENTION

The object of the present invention is to overcome the disadvantages cited in the foregoing by employing a machine for automated production of compositions of raw materials without the need for conveyor means.

To this end, the machine according to the invention for automated production of compositions of raw materials such as liquids, powders or pastes is characterized substantially in that it comprises:
- a guide assembly disposed above the floor,
- a support chassis (2), carried by the guide assembly and movable thereon along a horizontal longitudinal axis (AA') of the machine,
- a transport carriage, mounted to move on the support chassis along a horizontal axis (BB') perpendicular to the longitudinal axis (AA') of the machine,
- a lifting means carried by the said carriage, the said means being equipped with a lifting carrier element movable along a vertical axis,
- a weighing means carried by the lifting carrier element of the lifting means, the said weighing means being equipped with a part on which the load to be weighed is applied,
- a means for gripping the tanks individually, connected mechanically to the part of the weighing means on which the load to be weighed is applied,
- at least one device for withdrawing and distributing raw material in measured amounts, in front of which device the transported tank is intended to be positioned.

It is easily understood that this machine arrangement permits the floor to be clear of any mechanical element that may make it impossible or difficult to clean and decontaminate the floor.

In addition, the only movable part of the machine is disposed above the floor at a distance of at least several meters therefrom, so that it is out of range of the personnel operating at the machine. In this way the risks of accidents are reduced in particularly significant manner.

According to another characteristic of the invention, the machine is equipped with at least one mechanism for actuating the device for distribution of raw materials, which actuating mechanism is carried by the transport carriage.

Such an arrangement makes it possible to avoid associating, with each distributing device, an actuating device that would be specific thereto, and to avoid a plurality of actuating devices. Such an arrangement also permits simplification in the control of these actuating devices.

According to another characteristic of the invention, the carriage comprises a protective housing that encloses its mechanical and electrical elements, the said carriage being above terminations of the withdrawing devices by virtue of this housing. The arrangement of casing and the position of this casing prevent the raw materials from coming into contact with the mechanical and electrical elements of the carriage in the event of leakage.

According to another characteristic of the invention, the carriage is equipped with a mechanism for blocking the tank to ensure that it is immobilized relative to the gripping means. This prevents the tank from rocking while it is being transported, thus ensuring that liquid waves capable of altering the precision of weighing cannot develop in the tank.

Another object of the present invention is a tank for composition, characterized substantially in that it comprises two vertical handles intended to cooperate with the gripping means.

BRIEF DESCRIPTION OF THE FIGURES

Other advantages and characteristics of the invention will become apparent by reading the description of a preferred embodiment, given by way of non-limitative example and referring to the attached drawings, wherein.

BEST MANNER OF WORKING THE INVENTION

As represented, the machine according to the invention, for automated production of compositions of raw materials in at least one tank 100 with cover 101, which materials may be liquids, powders or pastes, comprises a signal processing and management unit 200, a guide assembly 1 disposed above the floor, a support chassis 2, carried by guide assembly 1 and movable thereon along a horizontal longitudinal axis AA' of the machine, a transport carriage 3 mounted to move on support chassis 2 along a horizontal axis BB' perpendicular to longitudinal axis AA' of the machine, a lifting means 4 carried by the said carriage 3, the said means 4 being equipped with a lifting carrier element 40 movable along a vertical axis CC', a weighing means 5 carried by lifting carrier element 40 of the said lifting means 4, a means 6 for gripping tanks 100 individually, connected mechanically to weighing means 5 and more precisely to a part 50 thereof provided to receive the load to be measured, and at least one device 8 for withdrawing and distributing raw material, in front of which tank 100 carried by the gripping means and transported by the transport and positioning assembly composed of carriage 3 and support carriage 2 is intended to be positioned. Tank 100 is positioned in front of withdrawing and distributing device 8 in order to receive a predetermined weighed amount of raw material. Measurement of the raw material is achieved by continuous weighing of tank 100 while the raw material is being poured into it.

As can be seen, the machine extends above a zone for storage of tanks 100, in which zone tanks 100 occupy assigned positions and, for example, are disposed in rank and file.

Processing and management unit 200, known in itself, with which the machine is equipped, is capable of processing the different electrical signals that it receives from machine components and of managing the operation of those components.

In the preferred embodiment, guide assembly 1 comprises two parallel horizontal rails 10 disposed at the same vertical level, these rails being integral with a load-bearing structure 11. This load-bearing structure 11 is advantageously composed of vertical columns fixed to the framework of the building that shelters the machine or else, according to another embodiment, of gantries braced via their legs on the floor of the building.

The guide assembly may be organized as modules, joined to one another by any means known to those skilled in the art.

Support chassis 2 has the form of a frame. This chassis 2 is equipped with rolling parts 20 engaged on guide rails 10 and with a driving means to ensure its displacement along the rails. Preferably the driving means comprises on the one hand an electrical stepping motor 21, whose rotary shaft is equipped with a toothed pinion 22, and on the other hand a rack 23, with which the said toothed pinion is engaged. In practice, toothed pinion 22 will be composed of a gear pulley and the rack of a gear belt disposed flat on one of guide rails 10.

Such an arrangement is suitable for monitoring the displacement of support chassis 2 along rails 10 and for monitoring the position of this chassis. This position will be determined in known manner by counting the number of electrical pulses delivered to the stepping motor.

For absolute monitoring of the displacement and position of the chassis, a coder known in itself may be coupled with the output shaft of the stepping motor.

To minimize the consequences due to loss of information relating to the position of the support chassis along rails 10, there is provided a mechanical stop installed in fixed position on the guide assembly. This mechanical stop constitutes a positional reference point. In the case of loss of information, support chassis 3 is brought up against the stop in order to initialize its position.

Support chassis 2 comprises two parallel horizontal guide rails 24, disposed at the same vertical level, the said rails 24 being perpendicular to guide rails 10 of guide assembly 1.

Carriage 3 comprises a three-dimensional skeleton composed of an assemblage of beams, columns and stays. This skeleton is equipped in its lower part of with rolling parts 30 engaged on guide rails 24 of the support chassis, and carries a driving means capable of displacing it along guide rails 24. As described in the foregoing, the driving means comprises on the one hand an electrical stepping motor 31, whose rotary shaft is equipped with a toothed pinion 32, and on the other hand a rack 33, with which the said toothed pinion 22 is engaged. Toothed pinion 32 is preferably composed of a gear pulley and the rack is composed of a gear belt disposed flat on one of guide rails 24. Monitoring of the displacement and position of carriage 3 is achieved by counting the number of electrical pulses delivered to stepping motor 31.

To ensure absolute monitoring of the displacement and position of the transport carriage, a coder known in itself may be coupled with the output shaft of the stepping motor.

Finally, to minimize the consequences due to loss of information relating to the position of the carriage along rails 24, a mechanical stop will be installed in fixed position on the support chassis. This mechanical stop constitutes a positional reference point for the carriage so that, in the case of loss of information about the position of the carriage, the latter can be brought up against the stop so that its position can be initialized.

Lifting means 4, carried by the transport carriage, comprises a lifting carrier element 40 capable of being displaced vertically by a driving means carried by transport carriage 3, weighing means 5 being installed on lifting carrier element 40. This lifting carrier element is advantageously composed of a horizontal platen 40.

The driving means may be an electric jack, a pneumatic jack, inflatable bags and other suitable driving parts known to those skilled in the art. Preferably, however, the driving means is composed of a plurality of vertical threaded columns 41 engaged at their upper and lower ends in guide bearings carried by the skeleton of the transport carriage, of nuts 42 engaged via threaded joints with columns 41 and fixed to horizontal platen 40, and of a mechanism for actuating the said columns 41 such that they turn around their longitudinal axis.

The actuating mechanism comprises gear pulleys 43 coupled respectively with threaded columns 41, a gear belt 44 engaged on gear pulleys 43 and on a gear pinion 45 coupled with the rotary output shaft of a stepping motor 46 installed in fixed position on an appropriate support fixed to the skeleton of the carriage. This arrangement of stepping motor, gear pinion, gear pulleys and gear belt makes it possible to ensure rigorous monitoring of the displacement and vertical height of platen 40.

Advantageously, weighing means 5 is composed of at least one platform scale, the platform of this scale constituting the part 50 on which the load to be weighed is applied. The weighing means may be composed of a single scale, but alternatively it may be composed of a plurality of superposed scales having different weighing ranges and precisions. The scale is capable of producing an electrical signal representative of the value of the weighed load that it supports. This signal is then processed by processing and management unit 200.

Gripping means 6 associated with the weighing means is composed of two vertical arms 60, each equipped at the lower end with a gripping hook 61. These two arms are integral with platform 50 of scale 5. In practice, the two vertical arms 60 are fixed by their upper end to a frame 62 affixed to the platform of scale 5.

Preferably carriage 3 is equipped with a protective housing enclosing its mechanical and electrical elements, the said carriage 3 being above the terminations of the withdrawing devices by virtue of this protective housing. The arrangement of casing and position of this casing ensure that the raw materials do not come into contact with the mechanical and electrical elements of the carriage in the event of leakage.

Via the gripping means as described, carriage 3 is caused to pick up tank 100 designated by the processing and management unit. By activation of the actuating mechanism of columns 41, platen 40, the scale and the gripping means are displaced vertically upward and the tank becomes lifted from the floor for the purpose of being weighed and transported to the zone of withdrawal of raw materials. Advantageously, the tank is lifted only a few millimeters, thus increasing the safety of its transportation.

Advantageously, carriage 3 is equipped with a mechanism 34 for stabilizing tank 100, especially for preventing the tank from rocking, during transportation of the tank, around its horizontal geometric axis of suspension defined by the two gripping hooks 61. This geometric axis may be defined as being that around which the tank is able to pivot freely while it is suspended on hooks 61. By virtue of stabilizing mechanism 34, any wave phenomenon that could interfere with weighing is avoided in the tank. Considering the short distance separating tank 100 from the floor, the stabilizing mechanism, by opposing rocking of the tank, is of such nature as to prevent any risk of impact between the bottom of the said tank and the floor. In this way any risk of deterioration of the tank is prevented.

According to a first embodiment, stabilizing mechanism 34 is composed of two vertical arms spaced apart from one another, fixed rigidly to the skeleton of the carriage and disposed symmetrically relative to the suspension axis defined above. While being lifted, the tank is applied against the lower end of the arms, thus ensuring that it is stabilized.

According to another embodiment, the stabilizing means is composed of two vertical jacks disposed symmetrically relative to the suspension axis, each being fixed by its body to the skeleton of the carriage. By deployment of the rod of each jack is brought with its end against the upper wall of tank 100.

As stated in the foregoing, the machine is equipped with at least one withdrawing and distributing device 8.

Preferably the machine comprises a plurality of withdrawing devices 8 organized in one or more horizontal rows, parallel to geometric axis AA'. As can be seen, withdrawing devices 8 are organized into at least two horizontal side rows, facing one another.

The machine may be equipped with at least one device 8 for withdrawing liquid and/or with at least one device for withdrawing and distributing powder and/or with at least one device for withdrawing and distributing paste.

As can be seen, the machine is equipped with a plurality of devices for withdrawing and distributing liquid, with a plurality of devices for withdrawing and distributing powder and with a plurality of devices for withdrawing and distributing pastes.

According to the preferred embodiment, each withdrawing and distributing device 8 is equipped with a control part 80, which can be acted on to initiate delivery of an amount of raw material. Preferably at least one actuating mechanism 7 carried by transport carriage 3 is provided to actuate control part 80.

Actuating mechanism 7 carried by the carriage, or each such mechanism, may be composed of an electric motor, whose output shaft is equipped with a cam 70 or a coupling part, for example of the same type as that described in French Patent Application 0508407. In the case of a cam-equipped motor, withdrawing device 8 may be in particular of the same type as that described in French Patent Application 0103349, and in the case of a coupling part, the withdrawing device may be of the same type as that described in particular in French Patent Application 0508407.

By displacement of support chassis 2 along rails 10 and displacement of the transport carriage along rails 24, the tank and carriage are disposed in front of the withdrawing device designated by the processing and management unit. More precisely, support chassis 2 is displaced along guide rails 10 in order to bring carriage 3 in front of the designated withdrawing and delivering device, and then carriage 3 is displaced on guide rails 24 toward the selected device 8, in order that actuating mechanism 7 with which it equipped is brought into correspondence with control part 80 of withdrawing device 8.

Control of withdrawal and delivery of the raw material is achieved by activation of actuating mechanism 7, which then acts on control part 80. The withdrawn amount is introduced into tank 100 through an aperture made in cover 101.

In order to ensure precise positioning of the carriage in front of the designated device 8 and adequate positioning of the actuating mechanism relative to control part 80, each withdrawing device 8 is equipped with an indexing means, with which a complementary indexing means carried by the carriage cooperates. In practice, the indexing means of each withdrawing device is composed of an aperture made in the body of the said device, and the indexing means, carried in fixed position by the carriage, is composed of a projecting finger. While carriage 3 is being positioned in front of the designated device, the projecting finger of the carriage is engaged in the aperture of withdrawing and distributing device 8.

To avoid any contamination of the tank contents, carriage 3 may be equipped with a protective part composed of a screen whose dimensions are larger than those of the opening of the tank, equipped with a transfer aperture through which the raw materials are poured toward the opening of the tank.

The operation of the machine is as follows: carriage 3 is positioned automatically in the storage zone above tank 100, in which the composition is to be made. The gripping means is lowered so as to lock onto the tank, and the latter is lifted several millimeters above the floor and transported to the withdrawing zone. It will be noted that transportation at a very short distance from the floor contributes to the safety of this operation. It will also be noted that the tank is weighed before introduction of the raw material and that it is weighed continuously during introduction of the raw material. In this way measurement of the raw material in the tank is ensured.

After having received the raw material or materials in the predetermined amounts, tank 100 may be returned to its storage area or else transported by the carriage to diverse modules carried by or associated with the structure of the guide assembly. As can be seen, especially in FIG. 1, the machine may be provided in non-limitative manner with a module 12 for detaching and replacing cover 101, an agitating module 13, a grouping module 14, a sampling module 15, a packaging module 16 and a tank-washing module 17, as well as with other modules such as, for example, a heating module, a centrifuging module, an emptying module, etc.

Figure 1:
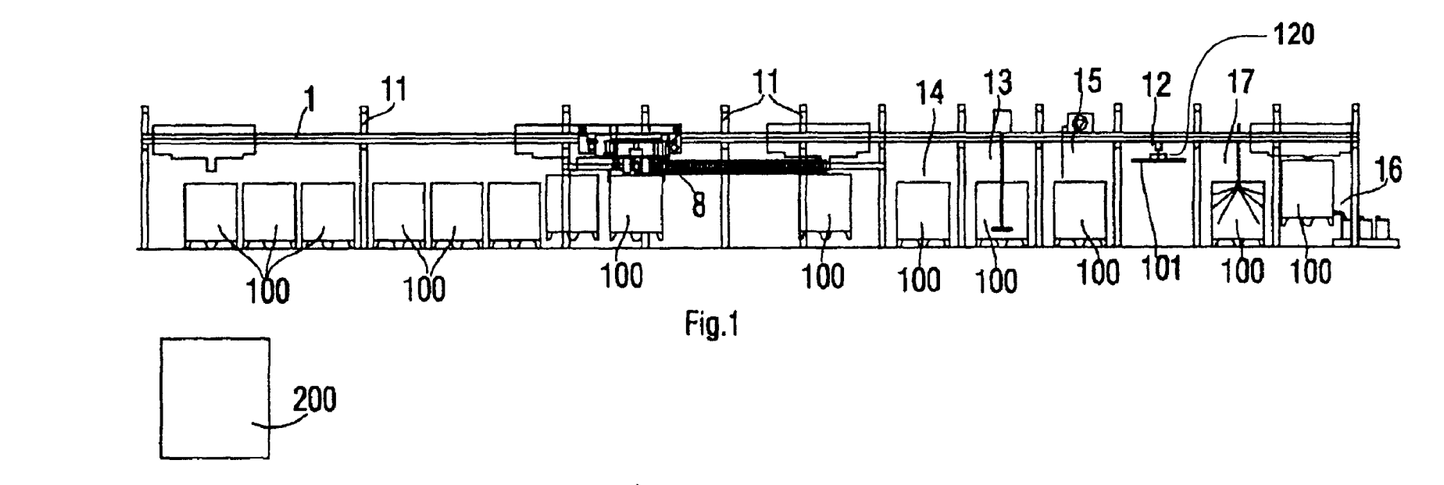
FIG. 1 is a profile view of a machine according to the invention in a first embodiment, different positions of the assembly comprising support chassis and transport carriage being represented in this figure.
Figure 2:
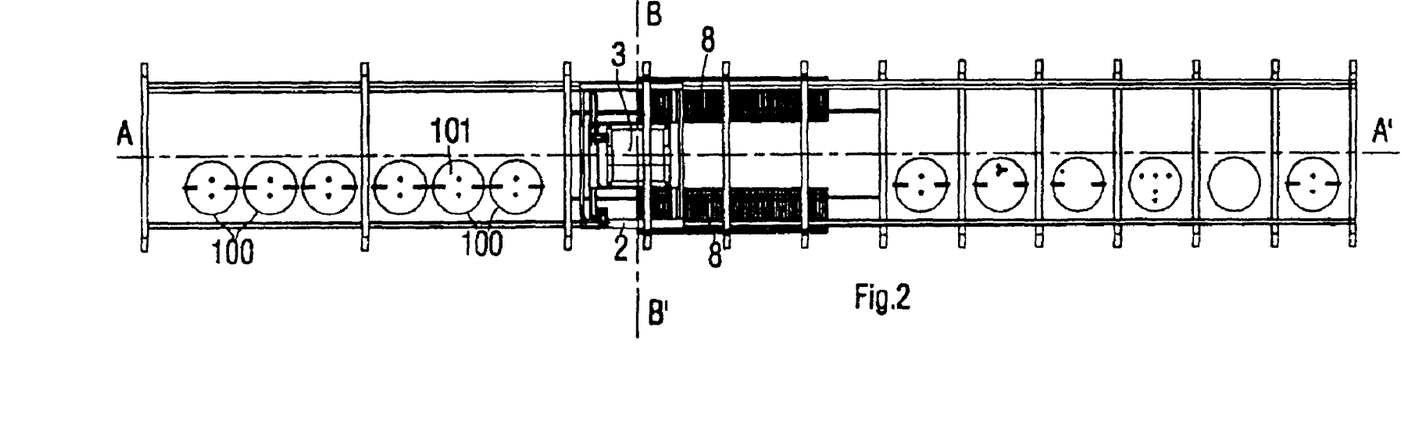
FIG. 2 is a view from above of the machine according to FIG. 1.
Figure 3:
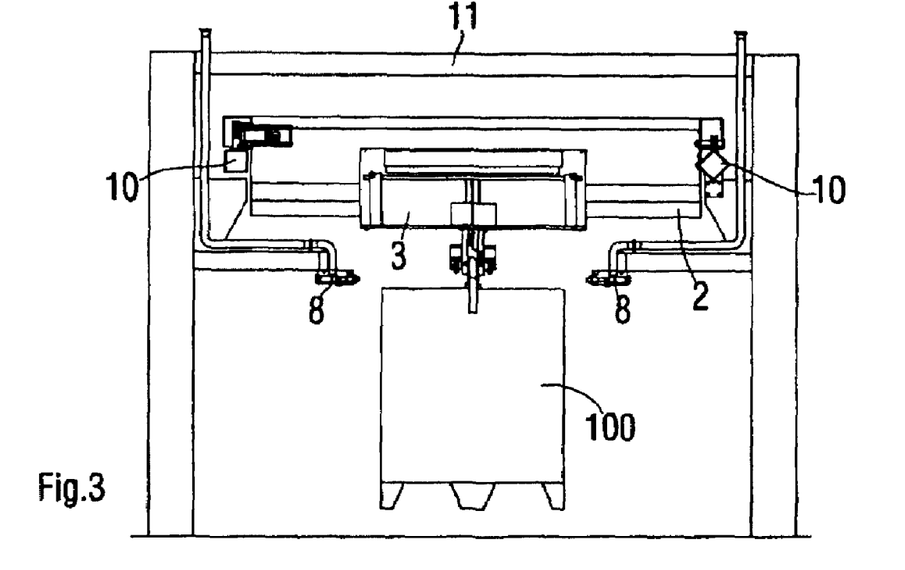
FIG. 3 is a front view of the machine according to FIG. 1.
Figure 4:
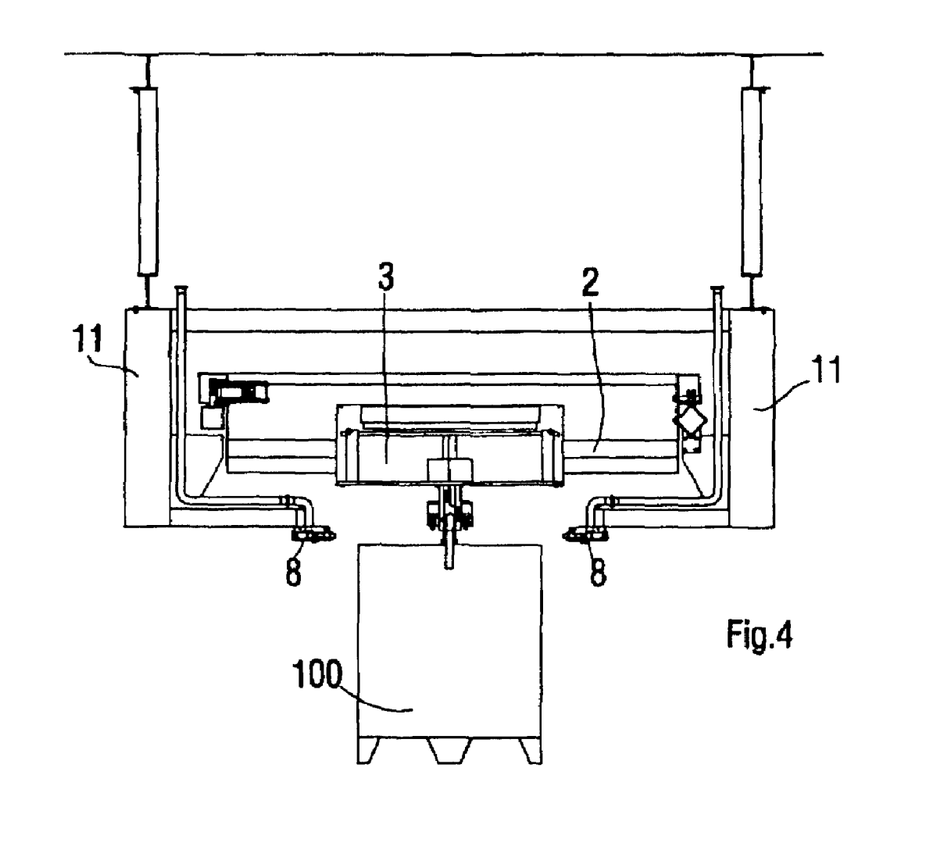
FIG. 4 is a front view of the machine according to a second embodiment.
Figure 5:
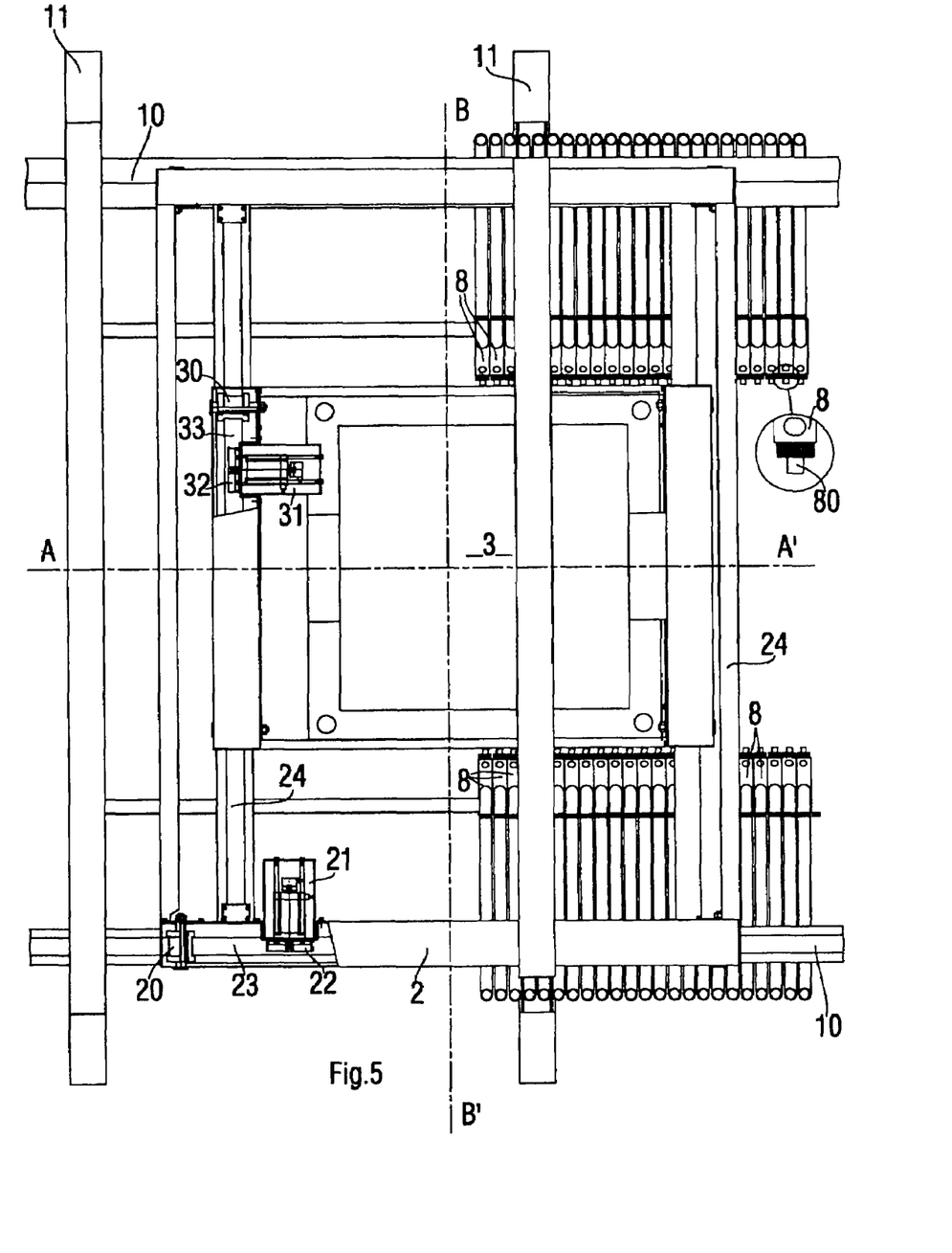
FIG. 5 is a detail view from above of a machine according to the invention, showing the support chassis and the transport carriage.
Figure 6:
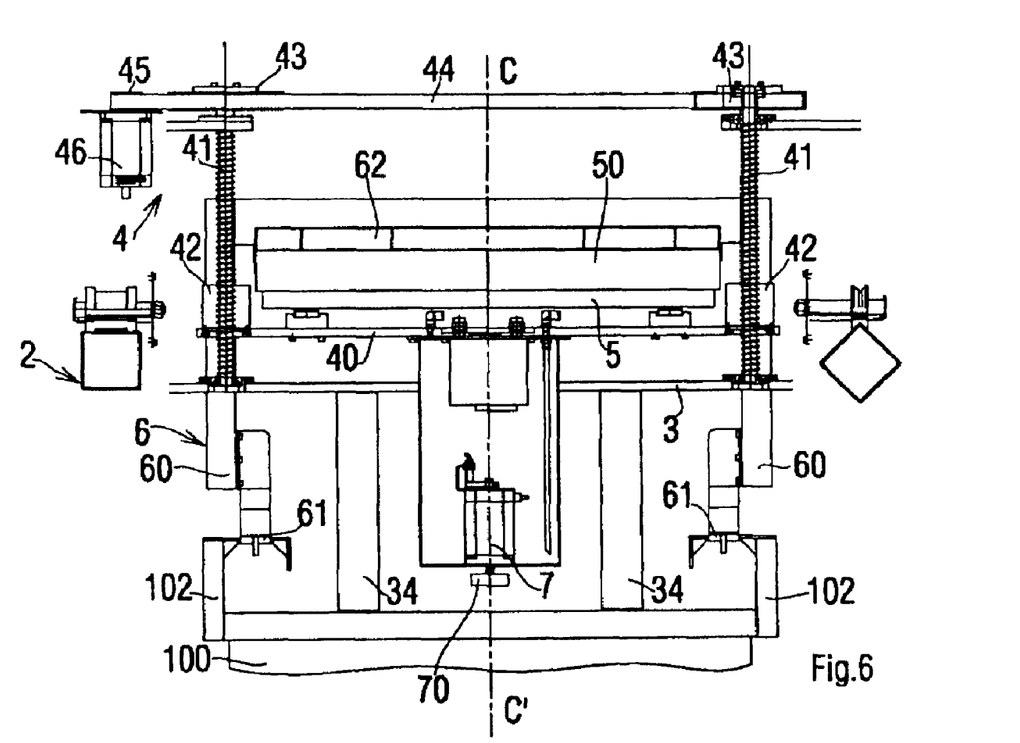
FIG. 6 is a view of the transport carriage of the machine according to the invention.
Figure 7:
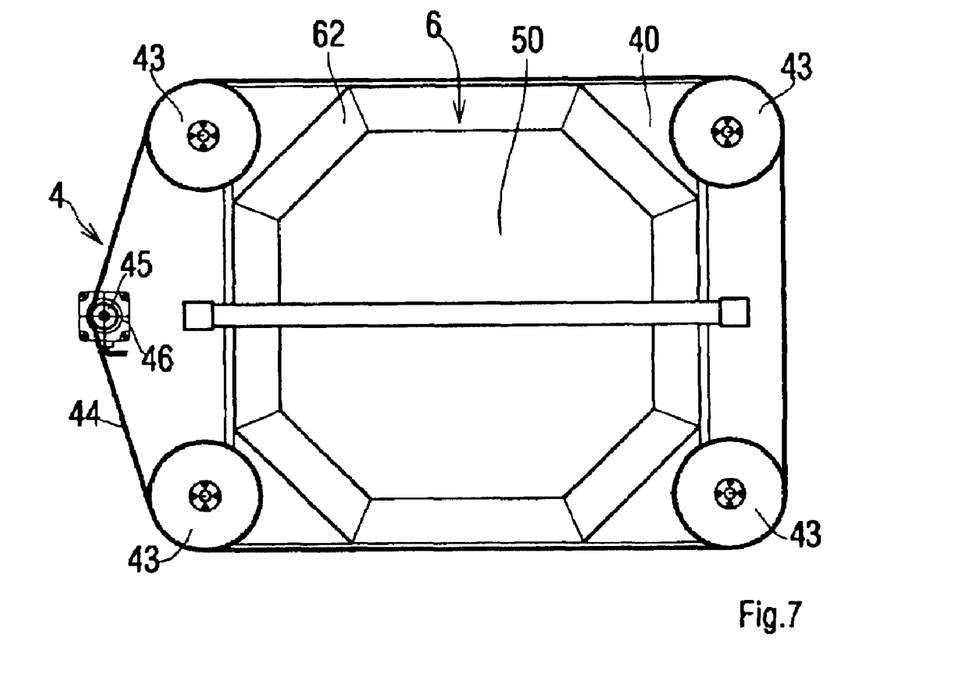
FIG. 7 is a view from above of the lifting means.

Module 12 for detaching the cover comprises a gripping device 120, mounted in fixed position on load-bearing structure 11. This gripping device comprises a vertically movable arm terminated by a gripping part, which may be composed of one or more suction cups, for example of the controlled type. The gripping part may also be composed of one or more electromagnets, if the nature of cover 101 lends itself thereto. The movable arm may be composed of the rod of a jack known in itself.

Agitating module 13 comprises a known agitator, mounted in fixed position by its body on the rod of a jack fixed by its body on load-bearing structure 11. By deployment of the rod of the jack, the agitator is made to penetrate into the tank to agitate the contents thereof, the cover of the tank having been detached previously by module 12.

Grouping module 14 covers an area in which the tanks are deposited, in order to receive raw materials manually or semi-automatically.

Sampling module 15 has the purpose of taking samples of the tank contents for analysis. This module may be provided with a controlled extracting syringe, carried, for example, by the rod of a jack fixed by its body to load-bearing structure 11. In addition, it may be provided with means intended to monitor the quality of the products obtained and/or with means for aiding in the creation of these products. These means may be systems for analysis on the basis colorimetry or rheology, systems for measurement and monitoring of the percentage of hydrogen and other elements, electronic noses, electronic tongues known in themselves and other devices.

Packaging module 16 has the purpose of packaging the contents of at least one of tanks 100 into appropriate receptacles of smaller size, such as bottles or other containers. The quantity of composition poured into each receptacle will be monitored on the basis of loss of weight.

Tank-washing module 17 has the purpose of rinsing the tanks by means of the solvent to be used in the next composition to be made in the tank in question. This washing module comprises in particular a sprinkler head carried at the lower end of a washing-liquid supply conduit, carried, for example, by the rod of a jack fixed by its body to load-bearing structure 11. By deployment of the rod of the jack, the sprinkler head is introduced into the tank to be cleaned.

Preferably these modules are fixed relative to the structure of the machine, and form diverse working stations, but as a variant, one or more of these modules may be mounted on board the transport carriage, so that several operations can be executed concurrently or simultaneously, such as withdrawal of raw materials, agitation of the mixture, etc.

According to a first embodiment, tank 100 comprises two vertical handles 102, each equipped at the end with a kind of hook designed to cooperate with gripping means 6 provided on the carriage.

Figure 8:
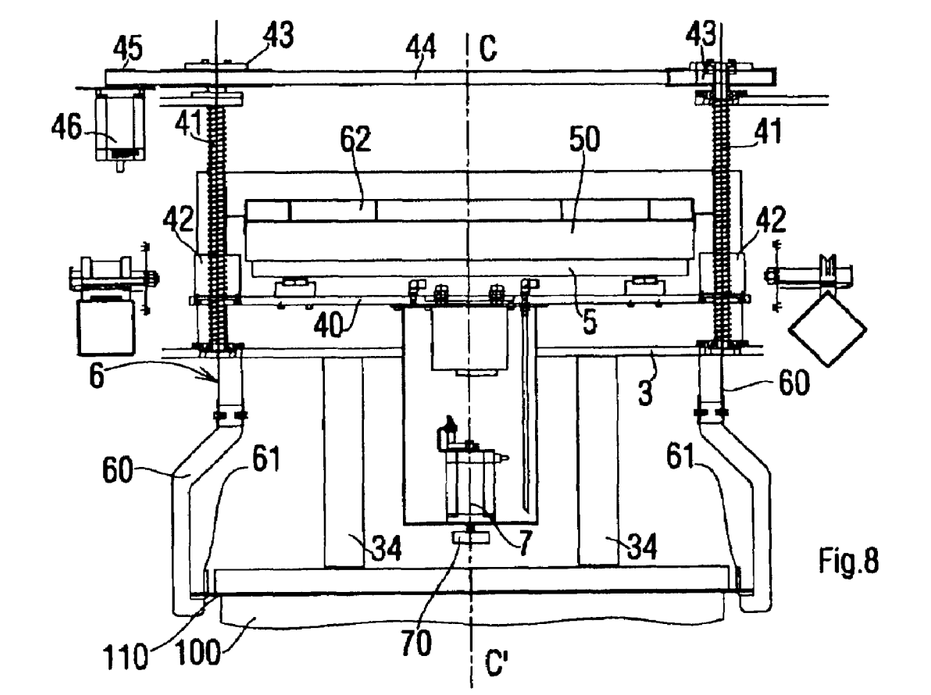
FIG. 8 is a view of the transport carriage of the machine equipped with a gripping means according to a second embodiment.
Figure 9:
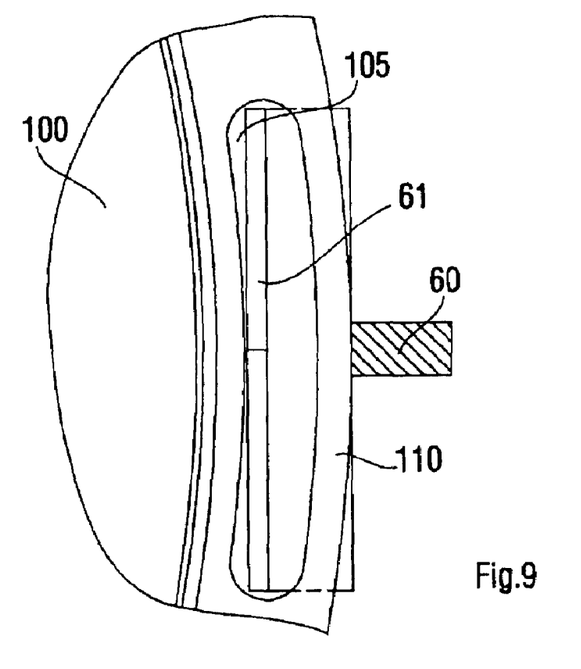
FIG. 9 is a detail view of the gripping means according to the second embodiment and a detail view of a tank equipped for receiving this means.

According to a second embodiment, such as represented in FIGS. 8 and 9, the gripping hooks are each composed of a triangular vertical plate, mounted on a horizontal base, forming an upwardly directed apex, and the tank is no longer equipped with vertical handles but is provided with two oblong gripping slots 105 in diametrically opposite positions, designed to receive the hooks and formed in at least one external radial projection 110, having the shape, for example, of a flange. This arrangement of triangular gripping hooks and oblong slots allows the tanks to be picked up even if they are slightly offset relative to their storage location, and allows these tanks 100 to be centered relative to the gripping means while they are being picked up. It is appropriate to note that the oblong slots each extend along a circumferential arc of a circle centered on the axis of revolution of the tank. This arrangement makes it possible to correct for poor angular positioning of the tank around its vertical axis of revolution and to re-establish an adequate angular position of the tank. In addition, the length of the base of each gripping hook is 1 to 2 mm shorter than the chord length subtending the aforesaid circumferential arc of a circle, thus ensuring relatively precise centering. While it is suspended, the tank is braced by the lower face of flange 110 against the horizontal base of each hook.

In the event of excessive offset, the tank may lie on the trajectory of the gripping means. If this is the case, the gripping means will eventually collide with the tank. The resulting impact will be detected by the weighing means and an electrical signal will be received by processing and management unit 200. By virtue of the cylindrical geometry of the tank, the transport carriage will experience a lateral thrust under the effect of the impact, as a result of which it will be caused to shift to one side or another. By analyzing the direction of displacement of this carriage, the processing unit will be able to determine whether the tank was offset to the right or left relative to its nominal position. It will then be possible, by successive small displacements, to position the gripping means adequately relative to the tank, in order to pick up this tank and return it to its position.

It is appropriate to note that the speed of displacement of the support chassis or of the carriage is so low that the shock generated when gripping means 6 collides with tank 100 remains slight and well below a value that could lead to deterioration of any elements.

It is also appropriate to note that, by virtue of the described means, it is possible to detect any type of obstacle placed in the trajectory of the gripping means.

To enhance the degree of safety of the machine and to avoid the handling of loads while personnel are in a predetermined perimeter, such as in the area of circulation of loads, the machine will be equipped with a locating system known in itself, such as, for example, a detection system of portable transmitting elements worn by the personnel. These elements may be transponders, RFID chips and other devices, which have the advantage of possessing an identifier specific to the individual. The detection of one or more persons in the pre-defined perimeter may result in the transmission of a warning signal and in shutdown of the machine. In this way the risks that persons could be injured by the tanks during their transport are reduced. The risks that persons present in the vicinity of the machine may inhale toxic vapors are also greatly reduced in this way. The use of RFID chips or identification elements will make it possible, by identification of the person, to ensure traceability of the movements of such a person for the purpose of determining the nature of potential dangers to which he has been exposed and, in the event of medical problems, for the purpose of rapidly identifying the cause of such problems.

If necessary, tanks 100 may be equipped with monitoring systems for temperature and other variables as well as with technical items of equipment such as agitators, analyzers and emptying components.

Finally, it must be noted that the use of the triaxial movement of the machine makes it possible to avoid critical situations, such as positioning of the hole for introduction of the material into the tank below a valve containing a raw material not intended for the composition.

The machine as described in the foregoing also makes it possible to pick up and automatically weigh a piece that will be subjected to modifications, such as a surface treatment consisting, for example, in the application of a special coating, of a paint, of a varnish or of a glue, or even of sandblasting, the quality of execution of which may be monitored on the basis of the variation of the weight of such a piece.

In this case, painting nozzles or any other spraying system will be used.

It is self-evident that the present invention can be provided with any layouts and variants from the field of technical equivalents without going beyond the scope of the present patent. For example, a plurality of assemblies, each composed of a support chassis and of a carriage, wherein each assembly has its assigned function and territory, may be installed on the same guide assembly. Management of territorial conflicts will be assured by processing and management unit 200.

The invention claimed is:

1. A machine for automated production of compositions of raw materials such as liquids, powders or pastes in at least one tank, comprising:
    a guide assembly disposed above a floor;
    a support chassis carried by the guide assembly and movable thereon along a first horizontal longitudinal axis (AA') of the machine;
    a transport carriage mounted to move on the support chassis along a second horizontal axis (BB') perpendicular to the first horizontal longitudinal axis (AA') of the machine;
    a lifting means carried by the transport carriage, the lifting means including a lifting carrier element that is movable along a vertical axis;
    a weighing means carried by the lifting carrier element of the lifting means, the weighing means including a part on which a load to be weighed is applied;
    a gripping means for gripping tanks individually, the gripping means being connected mechanically to the part of the weighing means; and
    at least one withdrawing and distributing device that withdraws and distributes raw material, in front of which device a transported tank is intended to be positioned.

2. The machine according to claim 1, wherein the at least one withdrawing and distributing device includes a control part, which can be acted on to initiate delivery of an amount of the raw material, and
    wherein the machine further comprises at least one actuating mechanism carried by the transport carriage the at least one actuating mechanism actuating the control part of the at least one withdrawing and distributing device.

3. The machine according to claim 2, further comprising a protective housing enclosing mechanical and electrical elements of the transport carriage, the transport carriage being disposed above terminations of the at least one withdrawing and distributing device.

4. The machine according to claim 1, wherein the guide assembly comprises two parallel horizontal guide assembly rails disposed at a same vertical level, the guide assembly rails being integral with a load-bearing structure.

5. The machine according to claim 4, wherein the support chassis includes
    rolling parts engaged on the guide assembly rails, and
    a driving means for ensuring displacement thereof along the guide assembly rails.

6. The machine according to claim 4, wherein the support chassis comprises two parallel horizontal support chassis rails, disposed at a same vertical level, the support chassis rails being perpendicular to the guide assembly rails.

7. The machine according to claim 6, wherein the transport carriage includes
    rolling parts engaged on the support chassis rails, and
    a driving means for ensuring displacement thereof along the support chassis rails.

8. The machine according to claim 1, wherein the lifting carrier element of the lifting means includes a horizontal platen,
    wherein the lifting carrier element is displaced vertically by a driving means carried by the transport carriage, and
    wherein the weighing means is installed on the horizontal platen.

9. The machine according to claim 8, wherein the driving means of the lifting means includes
    a plurality of vertical threaded columns engaged at upper and lower ends thereof in guide bearings carried by a skeleton of the transport carriage,
    nuts engaged via threaded joints on the threaded columns and fixed to the horizontal platen, and
    an actuating mechanism that actuates the threaded columns such that they turn around a longitudinal axis thereof, and
    wherein the actuating mechanism includes gear pulleys coupled, respectively, with the threaded columns, a gear belt engaged on the gear pulleys, and on a gear pinion coupled with the rotary output shaft of a stepping motor installed in fixed position on a support fixed to the skeleton of the transport carriage.

10. The machine according to claim 1, wherein the weighing means includes at least one scale having a platform.

11. The machine according to claim 10, wherein the gripping means includes two vertical arms having at a lower end thereof two gripping hooks.

12. The machine according to claim 11, wherein the two vertical arms of the gripping means are integral with the platform of the scale.

13. The machine according to claim 12, wherein each gripping hook includes a triangular vertical plate, mounted on a horizontal base, forming an upwardly directed apex.

14. The machine according to claim 13, wherein the at least one tank includes two oblong gripping slots in diametrically opposite positions, designed to receive the gripping hooks, the slots being formed in at least one external radial projection and each extending along a circumferential arc of a circle centered on an axis of revolution of the at least one tank.

15. The machine according to claim 1, wherein the transport carriage includes a stabilizing mechanism for stabilizing the tank, in order to prevent rocking thereof during transportation.

16. The machine according to claim 1, further comprising a module for detaching and replacing a cover of the tanks.

17. The machine according to claim 1, further comprising a module for agitating contents of the tanks.

18. The machine according to claim 1, further comprising a grouping module.

19. The machine according to claim 1, further comprising a sampling module.

20. The machine according to claim 1, further comprising a module for packaging contents of the at least one tank into receptacles,
wherein a quantity of composition poured into each receptacle is monitored based on loss of weight.

21. The machine according to claim 1, further comprising a module for washing the tanks.

22. The machine according to claim 1, further comprising a processing and management unit that is capable of processing different electrical signals that received from various components and that is capable of managing operation of the components.

* * * * *